July 23, 1935. E. F. LANKO 2,009,320

ANIMAL TRAP

Filed March 1, 1934

Inventor
Ernest F. Lanko.
By L. F. Randolph, Jr.
Attorney

Patented July 23, 1935

2,009,320

UNITED STATES PATENT OFFICE 2,009,320

ANIMAL TRAP

Ernest F. Lanko, Springville, Iowa

Application March 1, 1934, Serial No. 713,585

2 Claims. (Cl. 43—69)

The invention relates to traps for catching smaller animals such as rodents, and has for its particular object the provision of an improved construction of trap that is self-setting, the trapping member being operable by the weight of the animal entering it to entrap the animal within a cage provided therefor and when the weight of the animal is removed therefrom to return to its original trapping position for another victim.

Figure 1:
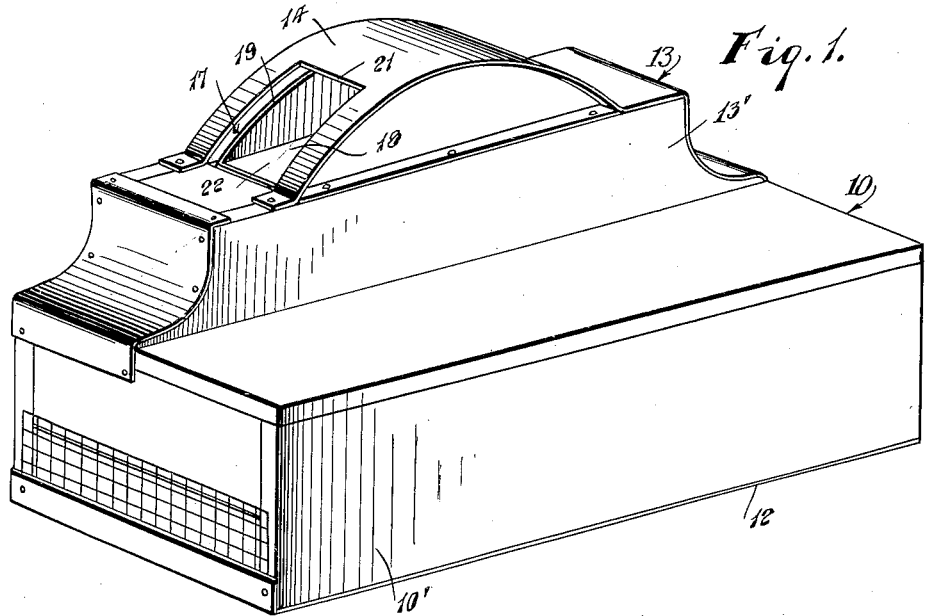
Figure 2:
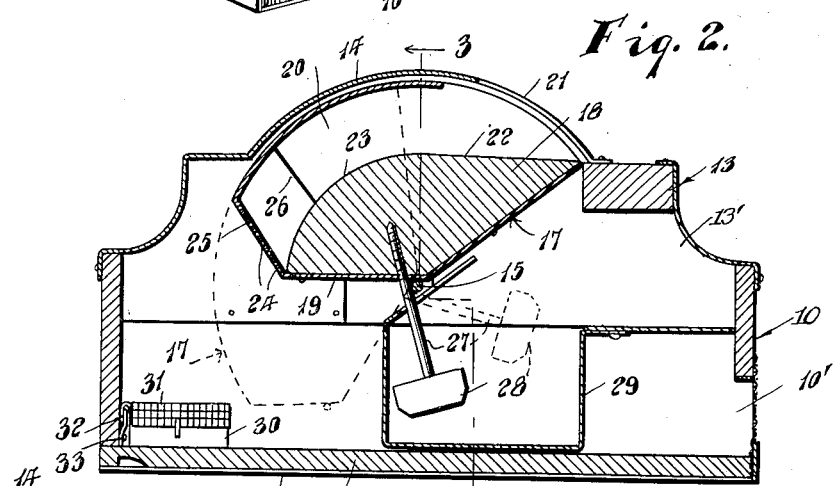
Figure 3:
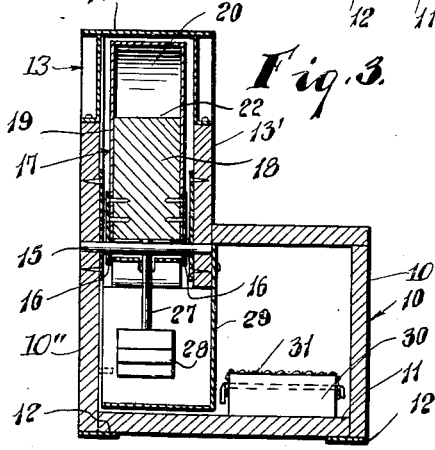
Figure 4:
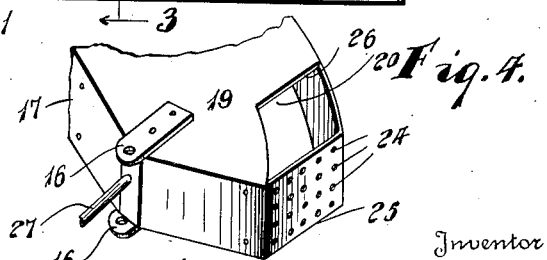

The invention will be described in detail hereinafter and will be found illustrated in the accompanying drawing in which Figure 1 is a view in perspective of the improved trap, Figure 2 is a longitudinal sectional view, Figure 3 is a transverse sectional view on a plane indicated by the line 3—3 of Figure 2, and Figure 4 is a fragmentary detail view in perspective of the entrapping member.

In the drawing similar reference characters are used to designate corresponding parts in all of the views.

The animal trap is provided with a substantially rectangular cage member 10 to hold the trapped animals, access to said cage member 10 for removal of the animals being had by means of a slidable bottom 11 mounted on guides 12. The top portion of the cage 10 has a hood 13 that is narrower than the cage itself, and provided with an arcuate top portion 14.

The cage member 10 has side walls 10′ and 10″, the wall 10″ being extended above the plane of the top of wall 10′ to form one side wall of the hood 13, 13′ designating the opposite side wall of said hood, the lower edge of said wall 13′ being spaced above the bottom 11 of the cage member 10.

Pivotally mounted on shaft 15 by means of ears 16 is a trapping member 17 having a core portion 18 that is preferably made of wood or other fibrous material, and a covering 19 of sheet metal that is extended above the core to provide a passageway 20 that when the trapping member 17 is in its normal position as shown in the drawing is alined with an entrance 21 in the arcuate portion 14.

The core member 18 is provided with a horizontal platform portion 22 that is presented toward the entrance 21 when the trapping member is in its normal position, and communicating with said platform portion 22 is a down-curved runway for the animal that will be attracted into the passageway by the odor from a bait contained within the cage member, and to be hereinafter more particularly described, said odor being admitted to the passageway by means of perforations 24 in the end wall 25 of the passageway.

An exit opening 26 in a side wall of the passageway is provided for exit of the animal when entrapped into the cage, said exit opening 26 when the trapping member is in trapping position as shown in the drawing is closed by the adjacent side wall of the hood member 13 and only exposed when the trapping member is moved by the weight of the victim into the dotted line position as shown in Figure 2. To hold the trapping member 17 in normal position as shown in the drawing, an arm 27 is provided and secured to its under side, 28 indicating a weight mounted on said arm to counterbalance the trapping member and to normally hold it in the position as shown in the drawing for reception of a victim.

29 designates a housing enclosing the weighted end of the arm 27, to prevent entrapped animals from interfering with the operation of the trapping member and possibility of escape from the cage.

The bait is secured within a container 30 covered by reticulous material 31, and having a downturned clip 32 on one of its sides that fits one or more clamping tongues 33 secured to a wall of the cage.

In operation it will be apparent that the victim will be enticed by the odor of the bait passing through the openings 24 in the end wall 25 of the passageway and will enter through the entrance 21 into the passageway, and after proceeding but a short distance the animal's weight will move the trapping member on its pivot inwardly of the cage member, so that the animal cannot retreat, and its only means of extricating itself from the passageway will be through the exit opening 26 into the cage, and as soon as it passes through the exit opening the trapping member will be returned to its original position ready for another victim.

I claim as my invention:—

1. An animal trap, comprising a cage, a hood member on said cage substantially narrower than the cage and having an entrance opening therein for access to the cage through said hood member, a trapping member normally located in said hood member and pivotally mounted, said trapping member having a passageway therein alineable with the entrance opening in one of its positions and having a laterally extending exit opening communicating with the passageway that is normally closed by a side wall of said hood member, a weighted arm secured to said trapping member to hold it with the passageway and entrance in alinement and the lateral exit closed, said trapping member being tiltable by a victim in the passageway to expose the exit opening in communication with the cage.

2. An animal trap, comprising a cage member having side walls, one of said side walls extending above the plane of the top of the other side wall, the extended portion of said wall providing one side wall of a hood member, another side wall for said hood member spaced from said first mentioned side wall and terminating above the bottom of said cage member, an arcuate top portion secured to said hood member walls and provided with an entrance opening, an arcuate trapping member pivotally mounted between said hood member walls and having a passageway therein having one of its ends alineable with said entrance opening, the opposite end of said passageway being closed and the closure perforated for emission of odor from bait in the cage member, the trapping member having a laterally extended exit opening communicating with the passageway, said laterally extended exit opening being closed when the trapping member is in position with the entrance opening alined with passageway and when the trapping member is rotated by the weight of a victim in the passageway the exit opening is exposed for release of the victim into the cage member, and a weighted arm secured to the trapping member to normally hold the trapping member in trapping position.

ERNEST F. LANKO.